April 14, 1959  D. E. KING ET AL  2,882,477
FIELD CURRENT REGULATOR WITH LINEAR SPEED SETTING RELATIONSHIP
Filed Feb. 5, 1957

Inventors
Donald E. King
Roger K. Cowdery
by Joseph E. Kerwin
Attorney

United States Patent Office 2,882,477
Patented Apr. 14, 1959

2,882,477

FIELD CURRENT REGULATOR WITH LINEAR SPEED SETTING RELATIONSHIP

Donald E. King, New Berlin, and Roger K. Cowdery, Milwaukee, Wis., assignors to Allis-Chalmers Manufacturing Company, Milwaukee, Wis.

Application February 5, 1957, Serial No. 638,339

10 Claims. (Cl. 318—357)

This invention relates generally to direct current regulators and specifically to motor field current regulators for variable speed drives.

In variable speed drives for machine tools, it is frequently desirable to operate direct current shunt wound motors through a relatively wide speed range by means of field current control. In its simplest form field current control consists of a variable resistance in series with the field and a constant potential source of direct current. By varying the resistance, the amount of current passing through the field is changed. In the case where good speed regulation is necessary, a current regulator may be inserted in the field control circuit.

Since motor speed is not a linear function of motor field current, it is necessary to introduce some form of compensation to achieve a linear relationship between the speed control rheostat setting and the motor speed. In the case of many variable speed drives such as those used on larger machine tools, the motor may be located at a considerable distance from the operator's position, necessitating a long run of conductor which must be of substantial size if losses are to be avoided. It is also desirable to have the speed setting device mounted within a small enclosure.

The problem of motor field current control has frequently been solved by means of linear rheostats in series with a constant potential source of direct current and the motor field. Because of the relatively high current requirements at full field, such linear rheostats are expensive and relatively large. It has been common practice to supply such field rheostats with special tapers that allow higher current ratings at the full field or low speed positions. These rheostats provide a rheostat setting-motor speed relationship that is far from linear. Tapered rheostats are generally designed for a particular installation and are not generally adaptable to another control situation. These systems suffer from the disadvantage that it is often not practical to mount the rheostat within a small remote operator's station due to the size and heat dissipation of the field rheostat and the necessary size of field lead conductors.

In addition, a rheostat type control is not efficient because a great deal of heat is dissipated in the rheostat itself. Tapered rheostats are designed for a particular installation and are not generally adaptable to another control situation. The use of a power amplifier between the speed setting means and the field power supply makes it possible to reduce the size and power dissipation of the speed setting rheostat and makes it convenient to mount the device at a remote position. The use of such power amplifier in itself does not, however, solve the problem of providing a linear relationship between motor speed and rheostat position.

In the embodiment described, the invention uses a self-saturating magnetic amplifier to control the input to a bridge rectifier, the output of which energizes the shunt field of a motor. One control winding of the magnetic amplifier is energized by a voltage proportional to field current across a resistor in series with the load and responds to an increase in field current by reducing current input to the bridge rectifier. A second control winding, energized by a variable portion of the same voltage, also reduces current input to the bridge rectifier when field current increases.

When the voltage energizing the second control winding is at a maximum, or stating it another way, when the same magnitude of voltage energizes both control windings, field current will be at a minimum value. Conversely, the maximum field current is approached as the voltage across the second control winding is decreased by means of a rheostat in parallel with the series resistor.

This rheostat produces a greater change in magnetic amplifier output per degree of rotation when the field current is high than when the field current is at a lower value. Since the motor requires a larger change in field current to alter speed, a given amount in the high field current or slow speed condition than at high speed, the resultant control is one in which the two nonlinear relationships, motor speed-field current and field current-rheostat setting, are combined to produce a rheostat setting-motor speed relationship which is substantially linear.

It is an object of this invention to provide a direct current regulator for the motor field of a shunt wound motor which provides a linear relationship between motor speed and the position of the motor speed controller.

It is another object of this invention to provide a motor field control which may be easily controlled from a remote location.

Another object of this invention is to provide a motor field current control which efficiently provides good current regulation.

A feature of this invention provides a motor field current control which is adaptable for use in a wide variety of situations without requiring substantial modification of the component values.

This invention also provides a current regulator in which the current output bears a hyperbolic relation to the control position.

Objects and advantages other than those above set forth will be apparent from the following description when read in connection with the accompanying drawing, in which.

Figure 1:
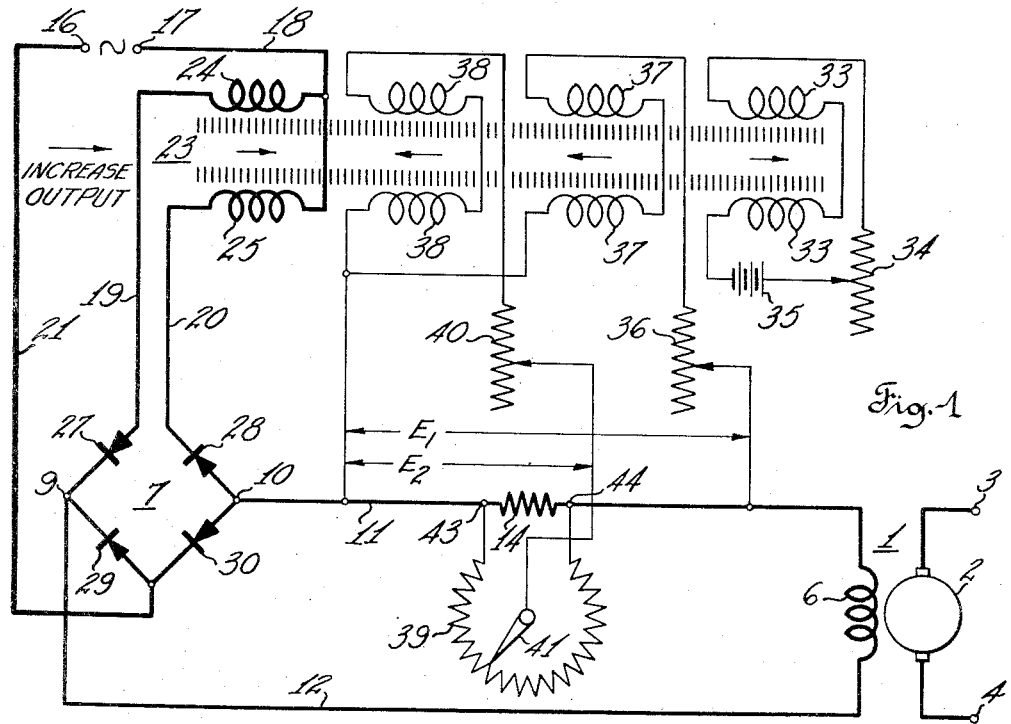
Fig. 1 is a schematic drawing of the preferred embodiment of this invention.

Referring to Fig. 1, the invention is shown embodied in control system for a shunt wound direct current motor 1 having an armature winding 2 with terminals 3 and 4 connected to a direct current power source. Shunt field 6 of direct current motor 1 is connected to rectifier bridge 7 at the direct current output terminals 9 and 10 through conductors 11 and 12 and resistor 14. Bridge rectifier 7 is connected on the alternating current side to alternating current source terminals 16 and 17 through conductors 18, 19, 20 and 21 and reactance windings 24 and 25. Reactance windings 24 and 25 are connected in parallel circuit relation with each other and are in series circuit relation with their respective self-saturating rectifiers 27 and 28. Self-saturating rectifiers 27 and 28 combine with rectifiers 29 and 30 to form a full wave bridge rectifier having D.C. output terminals 9 and 10.

A reference winding 33 of magnetic amplifier 23 is connected in series with a variable resistor 34 and a constant potential source of direct current such as battery 35. The magnetic flux produced by the reference winding adds to the magnetic flux produced by reactance windings 24 and 25, thereby tending to increase amplifier output and cause a greater current to flow to shunt field 6.

A balance winding 37 of the magnetic amplifier 23 is connected to be energized by the voltage appearing across resistor 14 which is in series with field 6 of the motor. The voltage drop across this resistor will be proportional to the field current of the motor. A variable resistor 36 in series with balanced winding 37 determines the current that will flow in balanced winding 37 for any given voltage $E_1$ across resistor 14. The magnetic flux produced by the balance winding tends to desaturate the core, thereby decreasing the amplifier output and speeding up the motor.

A pattern winding 38 of the magnetic amplifier 23 is connected to be energized by a variable portion of the voltage $E_1$ which is $E_2$ by means of rheostat 39. Variable resistance 40, in series with pattern winding 38, controls the current which will flow in winding 38 in response to any given voltage $E_2$. Balance winding 37 and pattern winding 38 make up control means which govern the direct current output from rectifier bridge 7.

At the beginning of a voltage cycle the rising voltage causes a current to flow in reactance winding 24 or 25, depending on the instant voltage polarity. The amount of load current required to cause magnetic saturation of the core is very small, causing core saturation to occur early in the voltage cycle. For the remainder of the half cycle, after saturation is reached, the current flowing in the load circuit is limited only by the load resistance and the resistance of the reactance winding. In other words, essentially the entire supply voltage appears across bridge rectifier 7 after the core becomes saturated.

The point of the voltage cycle at which the core saturates may be varied by means of the control windings. The reference winding 33 tends to saturate the core and together with the reactant windings 24 and 25 and self-saturating rectifiers 27 and 28 serves to cause saturation to be reached early in the voltage cycle. Both the pattern winding 38 and balance winding 37 tend to desaturate the core and therefore cause the saturation point to be reached later in the voltage cycle.

When rheostat tap 41 is coincident with terminal 43, the voltage across pattern winding 38 is zero. This is the slow speed or full field setting. Balance winding 37 is excited by the IR drop across resistor 14, tending to decrease the output of amplifier 23. Reference winding 33 and balance winding 37 coact with reactance windings 24 and 25 and self-saturating rectifiers 27 and 28 to regulate the magnetic amplifier output at the slow speed setting.

Balance winding 37 tends to decrease the output of amplifier 23 so an increase in current flowing through resistor 14 will add to the excitation of balance winding 37 and therefore reduce magnetic amplifier output to the previous level. A drop in the output current would decrease the excitation of balance winding 37, thereby restoring amplifier output to the previous level. The maximum current output of amplifier 23 is set by means of variable resistor 34 in series with direct current source 35 and reference winding 33. Increasing this resistance reduces the output of amplifier 23, decreasing the presaturation of the amplifier core.

As tap 41 is moved from a point coincident with terminal 44 to a position intermediate terminal 43 and terminal 44, the output of magnetic amplifier 23 will be increased, slowly at first and then more rapidly as the output current increases in response to the new position. It may be observed that the rate of change of amplifier output in response to a change of rheostat position will depend on the amount of current flowing through the rheostat. In addition, the rate of change will be affected by the relative number of turns in the balance and pattern windings and the setting of the variable resistors in series with these windings. These elements coact to produce a rapidly changing output at the low speed end and a slowly changing output at the high speed end of the rheostat.

Figure 2:
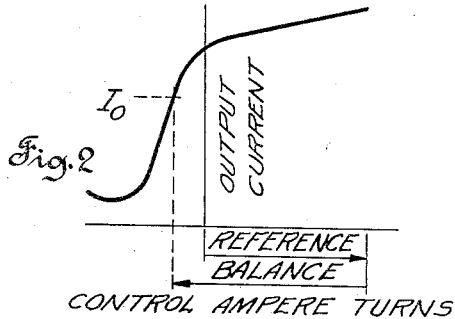
Figs. 2 and 3 are graphs illustrating the operation of the embodiment shown in Fig. 1.
Figure 3:
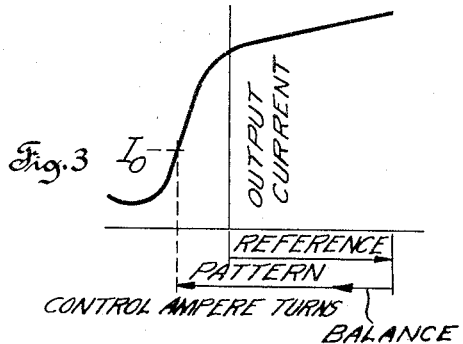

The coaction between the reference, balance and pattern windings is shown in Fig. 2 and Fig. 3. The curve shown in Fig. 2 represents the condition at the full field or slow speed condition. The magnetomotive force of the reference winding 33 is indicated by the arrow Reference and the magnetomotive force of the balance winding 37 is shown by arrow Balance. In Fig. 3 the condition at the weak field or high speed condition is shown. The magnetomotive force of the pattern winding 38 is shown by arrow Pattern; the magnetomotive force of the balance winding 37 and reference winding 33 is represented by the arrows Balance and Reference, respectively. It will be noticed that while the M.M.F. of the balance winding decreases as the amplifier output decreases, the sum of the pattern and balance winding M.M.F. is increasing as the output of the amplifier is reduced.

The relationship between the control windings and the magnetic amplifier output may be expressed mathematically as follows:

$K_1$=current gain of pattern winding
$K_2$=current gain of balance winding
$S$=control rheostat setting, $0<S<1$
$I_0$=regulated output for zero control signal to pattern winding, $S=0$
$I_R$=regulated output for other than zero, $0<S<1$
Low speed when $S=0$, High speed when $S=1$ $$I_R = I_0 - K_2(I_R - I_0) - SK_1 I_R$$
$$I_R(1+K_2+SK_1) = I_0(1+K_2)$$
$$I_R = \frac{I_0(1+K_2)}{1+K_2+SK_1} = \frac{I_0}{1+\frac{SK_1}{1+K_2}}$$

$$I_R = \frac{I_0}{1+SK_A} \text{ where } K_A = \frac{K_1}{1+K_2}$$

The last of these expressions shows the essentially hyperbolic relation of output current to the control rheostat setting.

To adjust the system for operation, the speed at the full field condition is set by means of the reference winding resistor 34 and balance winding resistor 36, with the speed control rheostat at the slow position. Resistor 40 provides an adjustment of the speed range obtainable with the speed control rheostat 41 and therefore controls the upper limit of speed which may be reached.

Figure 4:
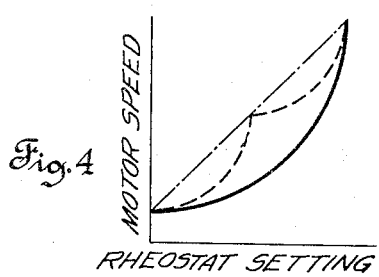
Fig. 4 is a graph which shows the relationship of motor speed to rheostat position for a conventional rheostat and a two step tapered rheostat.
Figure 5:
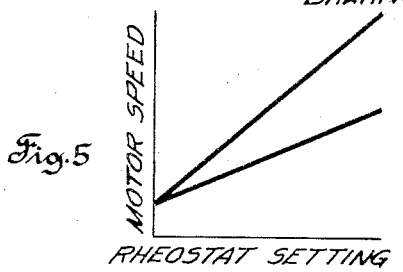
Fig. 5 is a graph illustrating the relationship of the motor speed to rheostat position in a control system embodying this invention.

It will be recognized from a comparison of Fig. 4 and Fig. 5, drawn to the same scale, that this invention represents a substantial improvement over the prior art. The solid line in Fig. 4 shows that the linear rheostat produces a speed setting relationship that is far from linear and is very critical to adjust near the high speed end. The relationship obtained with a two step tapered rheostat, shown by the broken line in Fig. 4, is a closer approach to the desired linear relation but contains a discontinuous point near the middle of the range and is also critical in adjustment. The construction line in Fig. 4 shows the true linear relation for the purpose of comparison. A speed control system using this invention has the relation shown in Fig. 5. The relation between the speed control rheostat setting and the motor speed is seen to be smooth and substantially linear. The two different lines or relationships shown on the graph may be achieved by changing the setting of resistors 34, 38 and 40 and are but two of the many which may be obtained.

While we have described in the foregoing a control circuit for a motor field, our invention is not limited solely to this use but is applicable generally where a current is sought to be regulated at a variable level.

What is claimed is:

1. A current regulator comprising a magnetic amplifier having reactance windings and control windings, rectifier means having alternating current input terminals and direct current output terminals, said reactance windings being in circuit with a source of alternating current and said alternating current input terminals for controlling power input to said rectifier means, a load circuit connected to said output terminals, first impedance means in series with said load and said output terminals, a first control winding on said magnetic amplifier in circuit with said first impedance means and energized by a first voltage proportional to field current across said impedance means tending to decrease input to said rectifier means, variable impedance means associated with said load circuit and a second control winding on said magnetic amplifier for providing a signal voltage proportional to the setting of the variable impedance means and the current flowing through the load, said second control winding being energized by the voltage across said variable impedance means tending to decrease the power input to said rectifier means.

2. A current regulator comprising a magnetic amplifier having reactance windings and control windings, rectifier means having alternating current input terminals and direct current output terminals, said reactance windings being in circuit with a source of alternating current and said alternating current input terminals controlling power input to said rectifier means, a load circuit connected to said output terminals, first impedance means in series with said load and said output terminals, a first control winding on said magnetic amplifier in circuit with said first impedance means and energized by a first voltage proportional to the field current through said impedance means, said first control winding tending to decrease input to said rectifier means, variable impedance means associated with said load circuit for providing a second voltage proportional to the position of said variable impedance means and the load current, a second control winding on said magnetic amplifier being energized by said second voltage and tending to decrease the power input to said rectifier means, a third control winding on said magnetic amplifier energized by a direct current source, said third control winding tending to increase input to said rectifier means.

3. In an electric drive, a shunt wound direct current motor with an armature winding and a field winding, said armature winding being energized by a first source of direct current, rectifier means having alternating current input terminals and direct current output terminals, a saturable reactor having reactance windings and control windings, said reactance windings being in circuit with a source of alternating current and said alternating current input terminals for controlling power input to said rectifier means, said field winding being connected to said direct current output terminals, first impedance means in series with said field winding and said output terminals, a first control winding on said saturable reactor in circuit with said first impedance means and energized by a first voltage proportional to field current through said impedance means, said first control winding thereby tending to decrease the input to said rectifier means, variable tap means associated with said impedance means and a second control winding on said saturable reactor for picking off a portion of said first voltage proportional to the field current and the position of said variable tap means, said second control winding tending to decrease the power input to said rectifier means.

4. In an electric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding being connected to said direct current output terminals, first impedance means in series with said field winding and said output terminals, a first control winding on said magnetic amplifier in circuit with said first impedance means and energized by a first voltage proportional to field current through said impedance means, said first control winding thereby tending to decrease the input to said rectifier means, variable tap means associated with said impedance means and a second control winding on said magnetic amplifier for picking off a portion of said first voltage proportional to the field current and the position of said variable tap means, said second control winding tending to decrease the power input to said rectifier means.

5. In an electric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding being connected to said direct current output terminals, first impedance means in series with said field winding and said output terminals, a first control winding on said magnetic amplifier in circuit with said first impedance means and energized by a first voltage proportional to field current through said impedance means, said first control winding thereby tending to decrease the input to said rectifier means, variable tap means associated with said impedance means and a second control winding on said magnetic amplifier for picking off a portion of said first voltage proportional to the field current and the position of said variable tap means, said second control winding tending to decrease the power input to said rectifier means, a third control winding on said magnetic amplifier energized from a direct current source tending to increase the power input to said rectifier means.

6. In an eelctric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding forming a load circuit connected to said direct current output terminals, first impedance means in series with said field winding and said output terminals, a first control winding on said magnetic amplifier in circuit with said first impedance means and energized by a first voltage proportional to field current through said impedance means, said first control winding thereby tending to decrease the input to said rectifier means, variable impedance means associated with said load circuit and a second control winding on said magnetic amplifier, said second control winding being energized by the voltage across said variable impedance means and tending to decrease power input to said rectifier means.

7. In an electric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding forming a load circuit connected to said direct current output terminals, first impedance means in series with said field winding and said output terminals, a first control winding on said magnetic amplifier in circuit with said first impedance means and energized by a first voltage proportional to field current through said impedance means, said first control winding thereby tending to decrease the input to said rectifier means, variable impedance means associated with said load circuit and a second control winding on said magnetic amplifier, said second control winding being energized by the voltage across said variable impedance means and tending to decrease power input to said rectifier means, a third control winding on said magnetic amplifier energized from a direct current source tending to increase power input to said rectifier means.

8. In an electric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding being connected to said direct current output terminals, first impedance means in series with said field winding and said output terminals for producing a first voltage proportional to load current, a first of said control windings energized by said first voltage tending to decrease the input to said rectifier means, second impedance means in parallel with said first impedance means, variable tap means associated with said second impedance means and a second of said control windings, said second control winding being energized by the voltage across said variable tap means tending to decrease the input to said rectifier means, a third control winding on said magnetic amplifier energized from a direct current source tending to increase power input to said rectifier means.

9. In an electric drive, a shunt wound direct current motor with an armature winding and a field winding, said armature winding being energized by a first source of direct current, rectifier means having alternating current input terminals and direct current output terminals, a magnetic amplifier having reactance windings and control windings, said reactance windings being in circuit with a source of alternating current and said alternating current input terminals for controlling power input to said rectifier means, said field winding being connected to said direct current output terminals, first impedance means in series with said field winding and said output terminals for producing a first voltage proportional to load current, a first of said control windings being energized by said first voltage tending to decrease the input to said rectifier means, a first variable resistor in series with said first control winding, second impedance means in parallel with said first impedance means, variable tap means associated with said second impedance means and a second of said control windings, said second control winding being energized by the voltage across said variable tap means, said second control winding thereby tending to decrease the input to said rectifier means, a second variable resistor in series with said second control winding, a third control winding on said magnetic amplifier energized from a direct current source and tending to increase the power input to said rectifier means, a third variable resistor in series with said third control winding for varying the current flow therein.

10. In an electric drive, a shunt wound direct current motor with an armature winding and a field winding, said armature winding being energized by a first source of direct current, rectifier means having alternating current input terminals and direct current output terminals, a self-saturating magnetic amplifier having reactance windings and control windings, said reactance windings being in circuit with a source of alternating current and said alternating current input terminals for controlling power input to said rectifier means, said field winding forming a load circuit connected to said direct current output terminals, a first resistor in series with said field winding and said direct current terminals for producing a first voltage proportional to load current, a first of said control windings energized by said first voltage and tending to decrease input to said rectifier means, a second of said control windings energized by a voltage proportional to the load current tending to decrease input to said rectifier means, variable impedance means in circuit with said second control winding varying the response of said amplifier to said voltage proportional to load current.

References Cited in the file of this patent

UNITED STATES PATENTS

| | | |
|---|---|---|
| 2,558,094 | King | June 26, 1951 |
| 2,795,751 | Montgomery | June 11, 1957 |